(12) United States Patent
Castle

(10) Patent No.: US 6,583,625 B1
(45) Date of Patent: Jun. 24, 2003

(54) METAL DETECTOR AND METHOD IN WHICH MINERALIZATION EFFECTS ARE ELIMINATED

(75) Inventor: Jonathan Castle, Los Angeles, CA (US)

(73) Assignee: FRL, Inc., Los Banos, CA (US)

( * ) Notice: Subject to any disclaimer, the term of this patent is extended or adjusted under 35 U.S.C. 154(b) by 0 days.

(21) Appl. No.: 09/690,700

(22) Filed: Oct. 16, 2000

(51) Int. Cl.⁷ .................. G01V 3/10; G01V 3/165; G01V 3/38
(52) U.S. Cl. ............... 324/329; 324/225; 324/233
(58) Field of Search ............... 324/225, 233, 324/239, 329; 340/551

(56) References Cited

U.S. PATENT DOCUMENTS

| | | | |
|---|---|---|---|
| 3,763,424 A | * 10/1973 | Bennett, Jr. et al. | 324/239 X |
| 4,110,679 A | * 8/1978 | Payne | 324/329 |
| 4,128,803 A | * 12/1978 | Payne | 324/329 |
| 4,325,027 A | * 4/1982 | Dykstra et al. | 324/225 |
| 4,486,713 A | * 12/1984 | Gifford | 324/329 |
| 4,600,356 A | * 7/1986 | Bridges et al. | 324/329 X |
| 4,700,139 A | * 10/1987 | Podhrasky | 324/329 |
| 5,414,411 A | * 5/1995 | Lahr | 324/329 X |
| 5,506,506 A | * 4/1996 | Candy | 324/329 |
| 5,576,624 A | * 11/1996 | Candy | 324/329 |
| 5,729,143 A | * 3/1998 | Tavernetti et al. | 324/329 |
| 6,172,504 B1 | * 1/2001 | Earle | 324/329 |
| 6,326,791 B1 | * 12/2001 | Bosnar | 324/329 |

FOREIGN PATENT DOCUMENTS

| | | | | |
|---|---|---|---|---|
| GB | 2 041 532 | * | 9/1980 | 324/329 |
| GB | 2 071 327 | * | 9/1981 | 324/329 |

\* cited by examiner

*Primary Examiner*—Gerard R. Strecker
(74) *Attorney, Agent, or Firm*—Edward S. Wright

(57) ABSTRACT

Metal detector and method in which soil mineralization effects and responses to other undesired materials are eliminated. A periodic excitation signal is transmitted into an area where a target is to be detected, and signals returned by the target are processed to provide an output signal corresponding to the target. A plurality of signals are extracted from the output signal during different phase intervals in the period of the excitation signal and processed to provide signals which are free from ferrite response and/or response to other undesired materials. The signals which are free from response to ferrite and/or other undesired materials are then compared to identify the target.

24 Claims, 9 Drawing Sheets

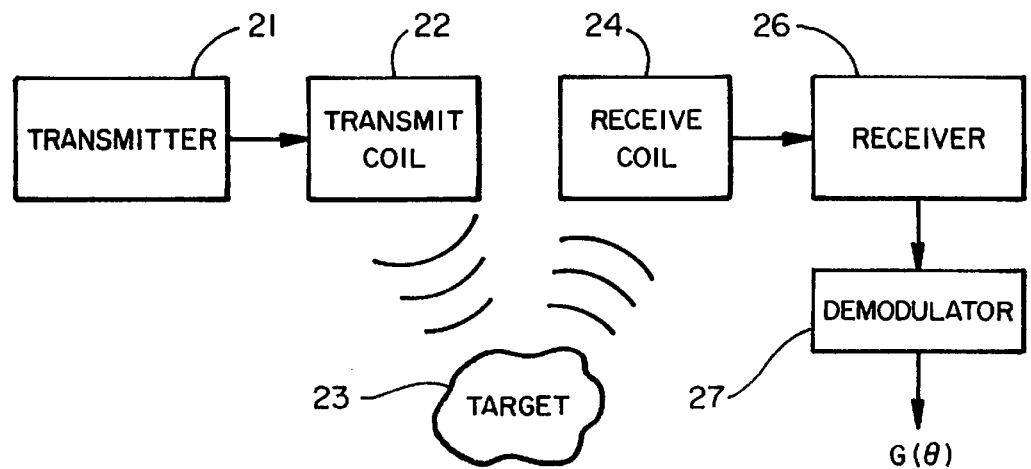
FIG_1
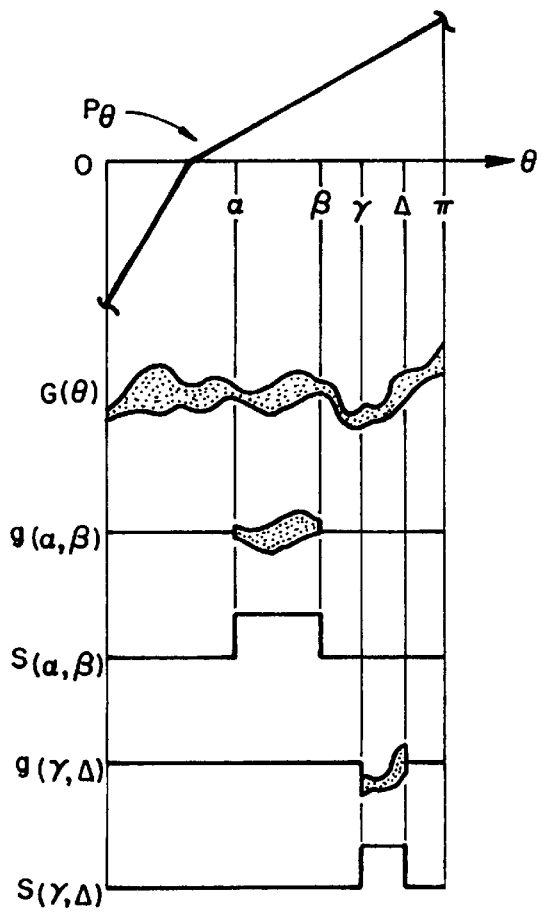
FIG_2

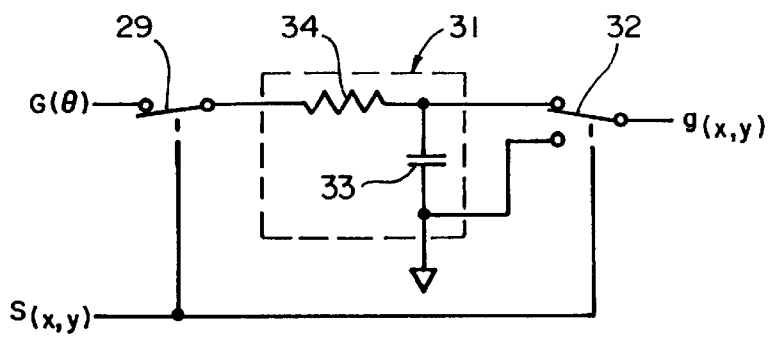
FIG_3
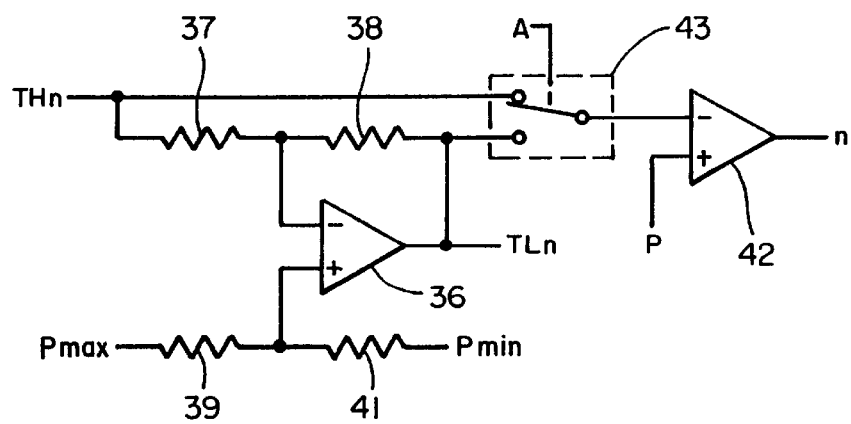
FIG_4
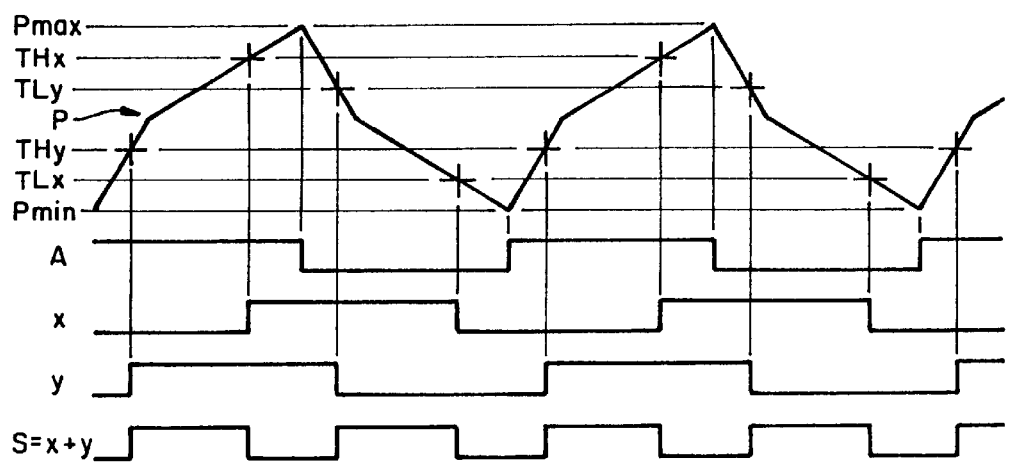
FIG_5

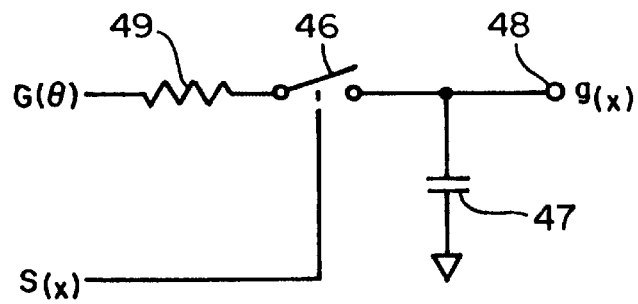
FIG_6
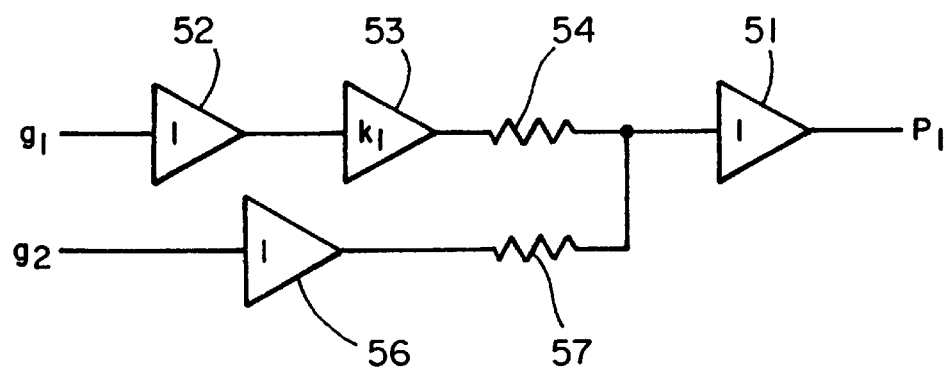
FIG_7
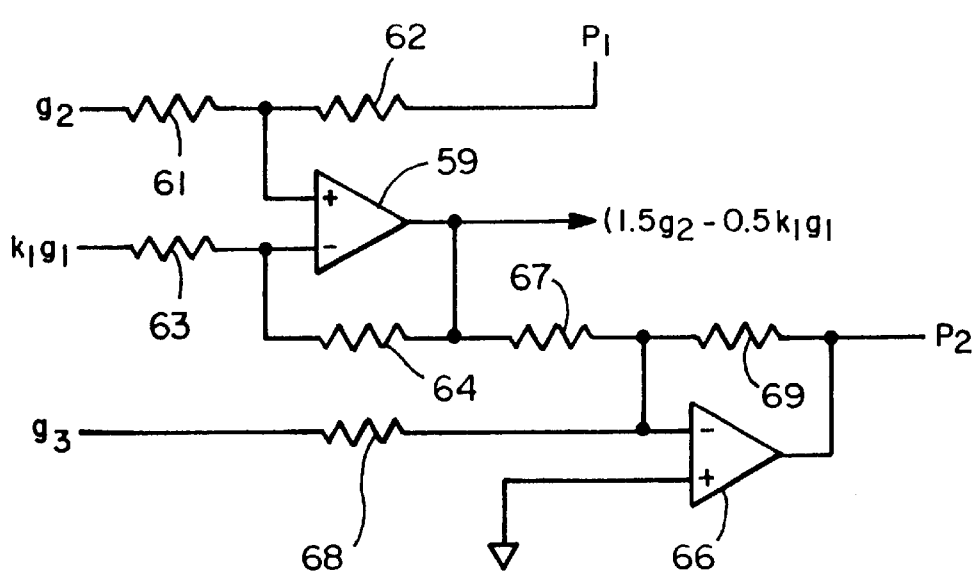
FIG_8

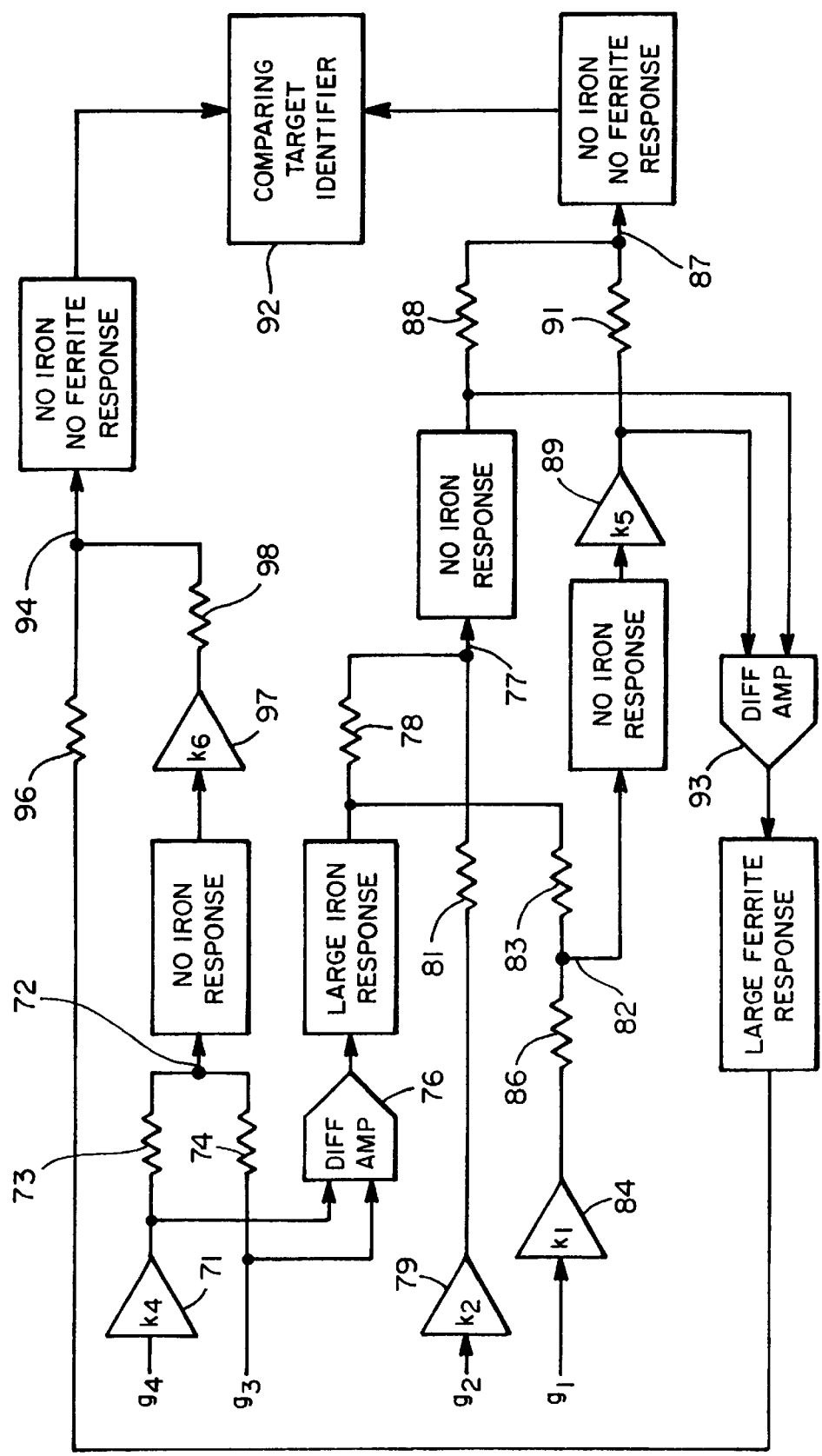
FIG_9

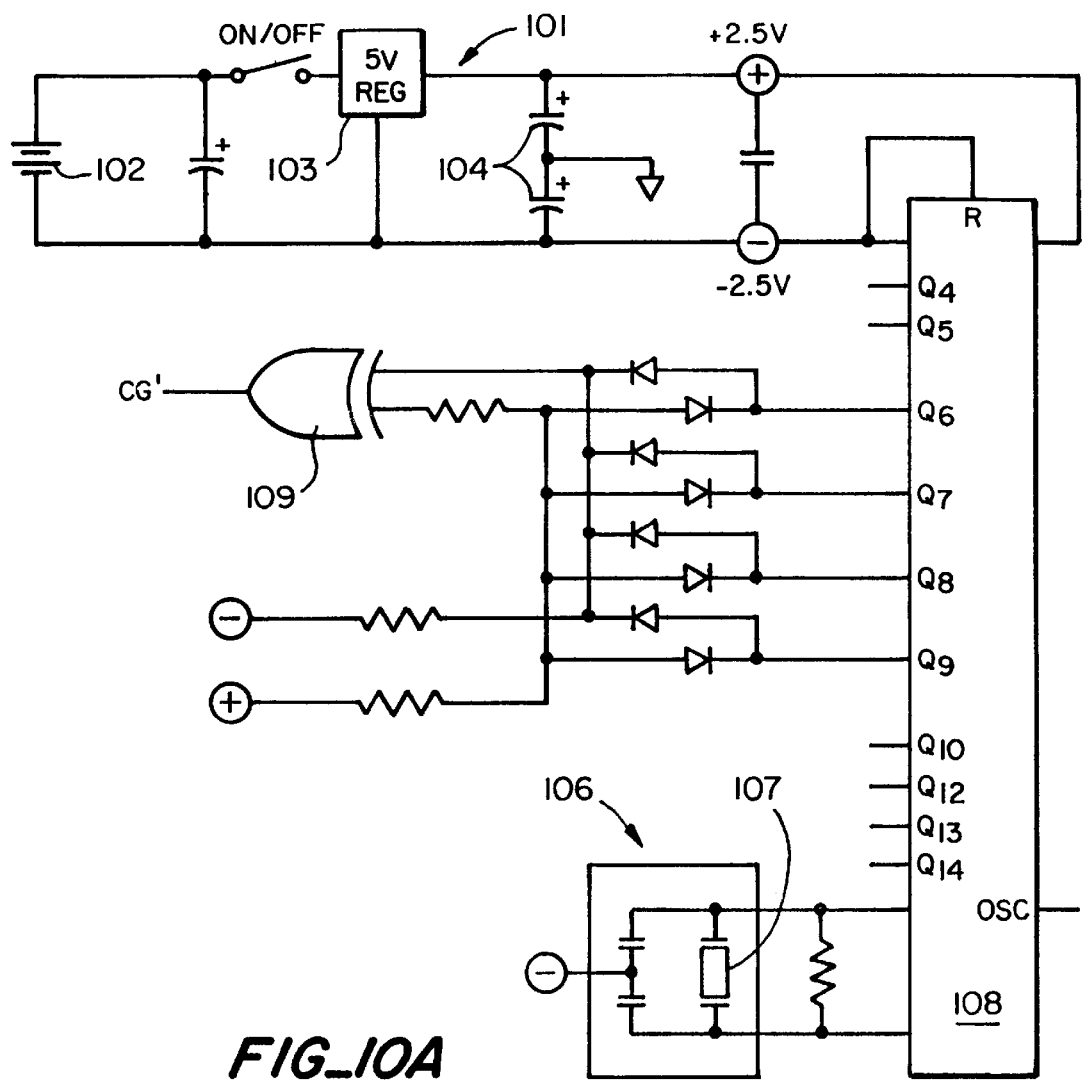
FIG_10A
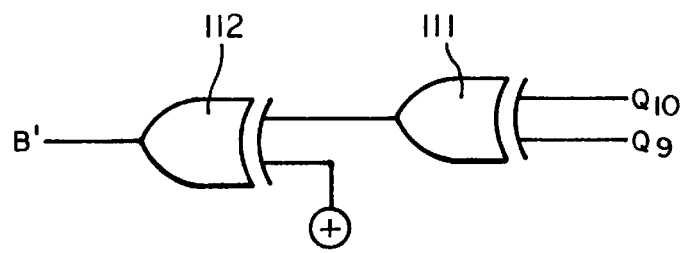
FIG_10B

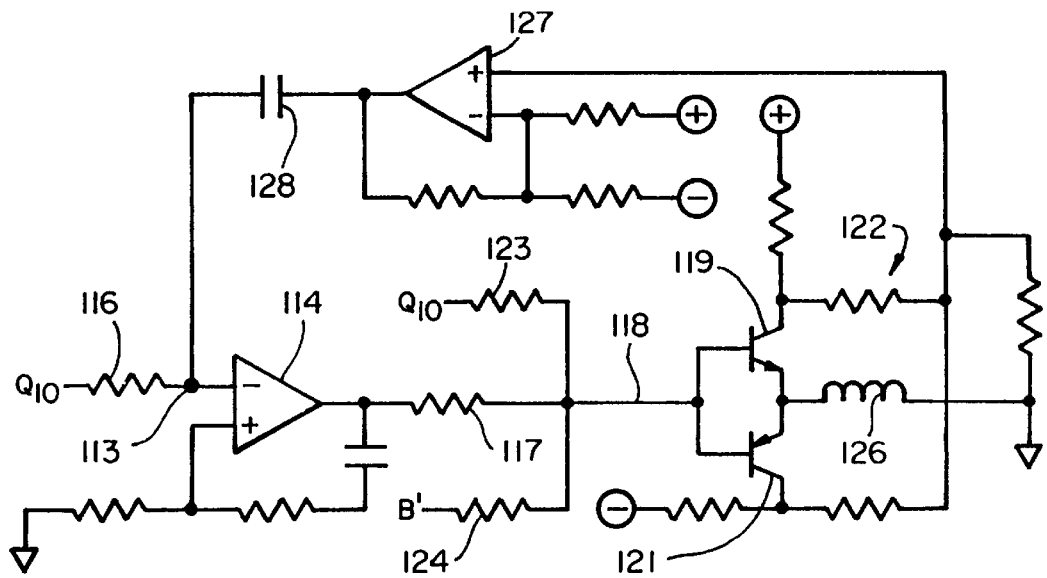
*FIG_10C*
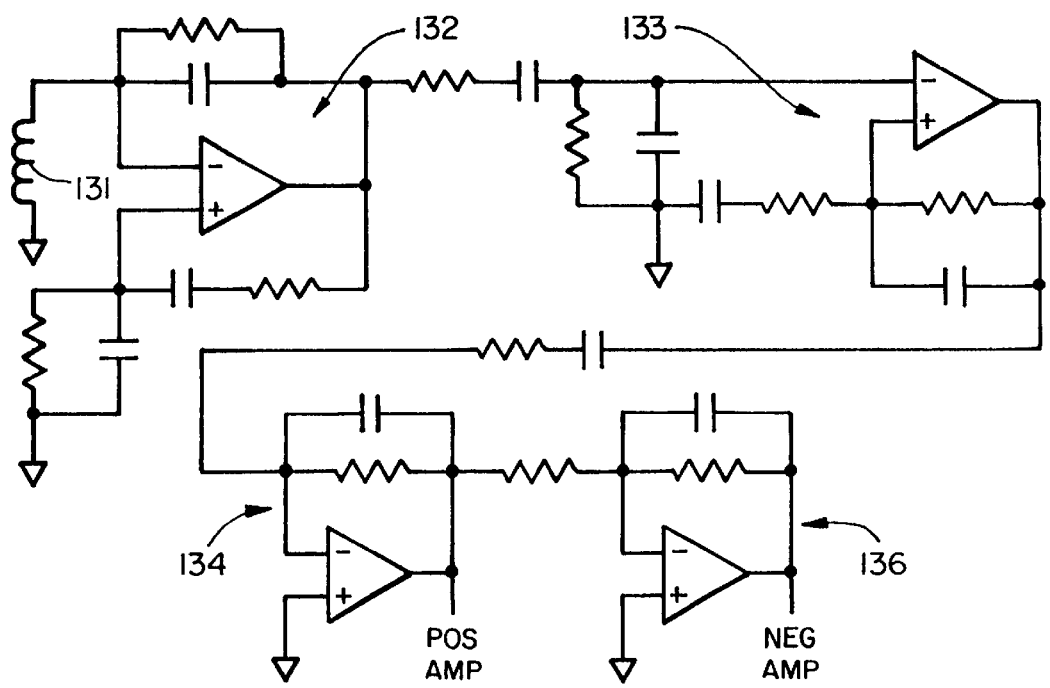
*FIG_10D*

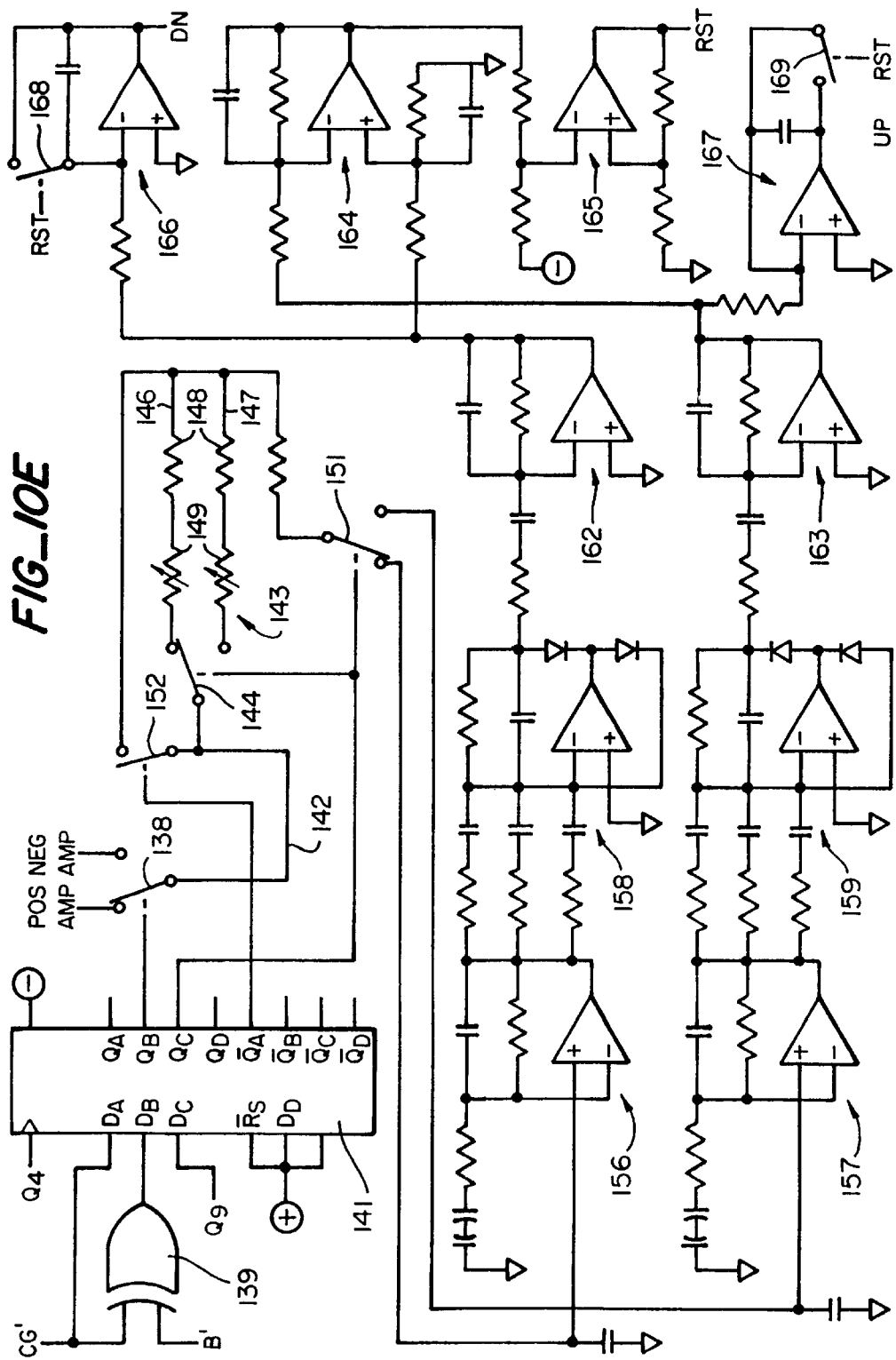
FIG_10E

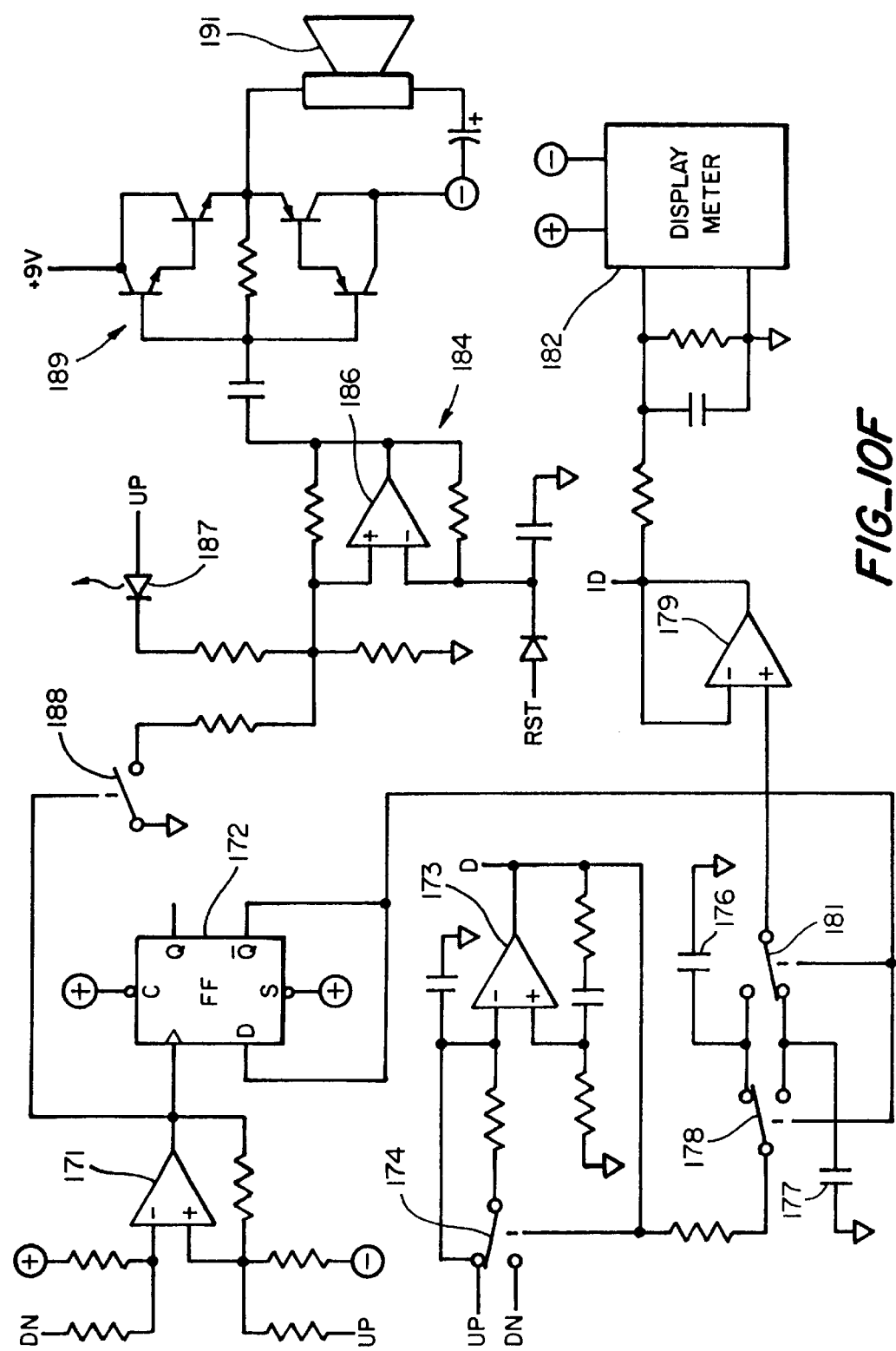
FIG_10F

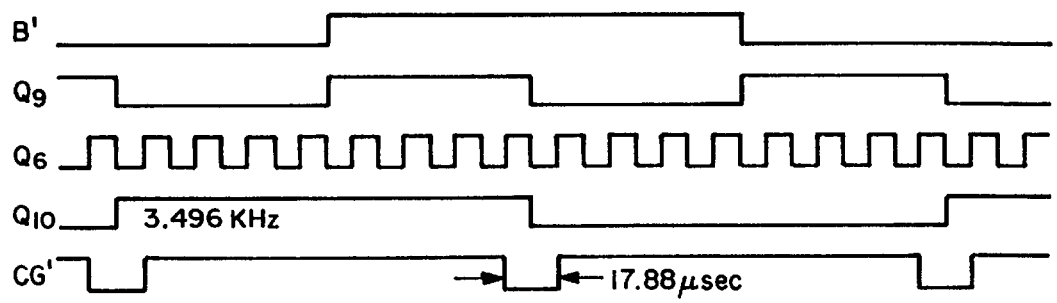
FIG_11
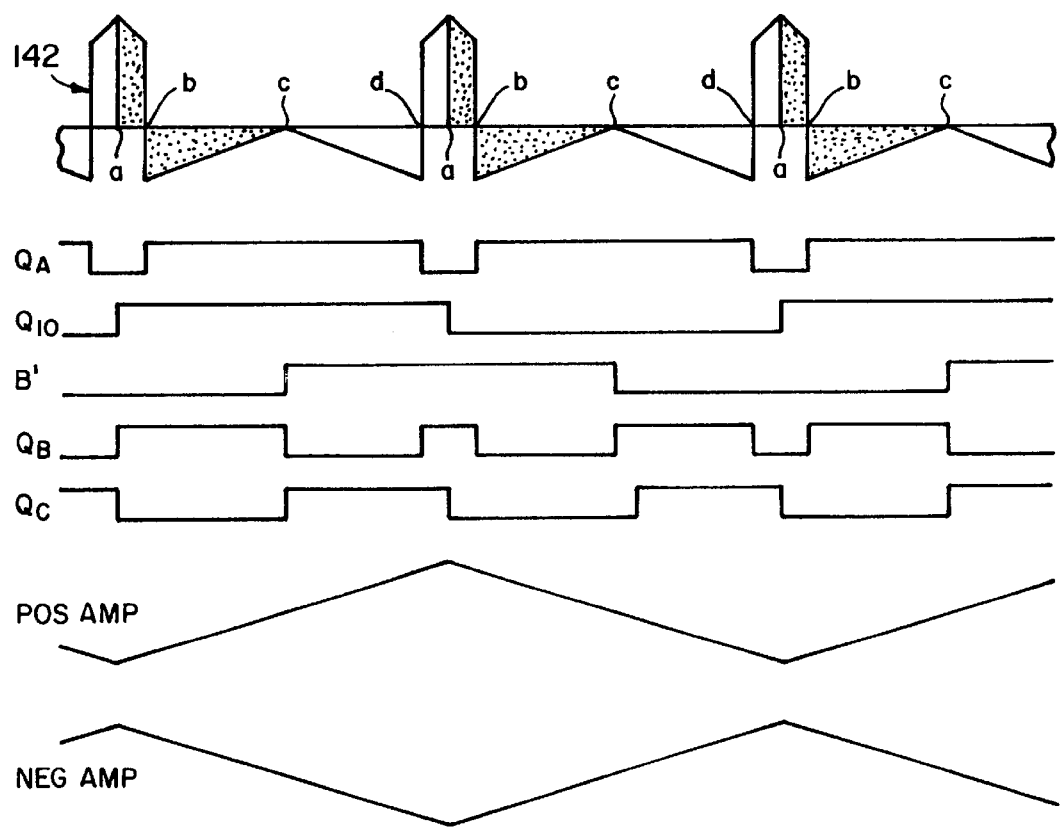
FIG_12

METAL DETECTOR AND METHOD IN WHICH MINERALIZATION EFFECTS ARE ELIMINATED

This invention pertains generally to metal detectors and, more particularly, to a metal detector and method in which the effects of mineralization on target identification are eliminated.

A significant problem with metal detectors is that mineralization in the soil surrounding the target can cause the target to appear to be something other than what it is. Numerous attempts have been made to minimize this problem, but the result has remained a function of the background mineralization, with the type of target indicated depending upon the level and distribution of mineralization in the soil. The effect of the mineralization on target identification is sometimes referred to as the "ferrite response".

It is in general an object of the invention to provide a new and improved metal detector and method.

Another object of the invention is to provide a metal detector and method of the above character which eliminate the effects of soil mineralization on target identification.

These and other objects are achieved in accordance with the invention by providing a metal detector and method in which two or more signals containing target information are extracted from the detector response during different phase intervals of the excitation signal and processed to eliminate ferrite response and/or response to other undesired materials. Those signals are then compared to identify targets without interference from ferrous materials or minerals which may be present.

FIG. 1 is a block diagram of a metal detector of the type to which the invention pertains.

FIG. 2 is a waveform diagram illustrating how the response of a metal detector to a given target can be broken up into a number of independent time intervals.

FIG. 3 is a diagram of one embodiment of a circuit for sampling the response of a metal detector individual time intervals.

FIG. 4 is a diagram of a circuit for gating time intervals in an excitation waveform in accordance with a control signal.

FIG. 5 is a set of waveforms illustrating the operation of the circuit of FIG. 4.

FIG. 6 is a diagram of another embodiment of a circuit for sampling the response of a metal detector individual time intervals.

FIGS. 7–8 are diagrams of circuits for sampling the outputs of a metal detector different time intervals to provide output signals which are free of ferrite response.

FIG. 9 is a block diagram of a circuit for combining the outputs of a metal detector at different time intervals to provide output signals which are free of both iron response and soil mineralization response.

FIGS. 10A–10F are circuit diagrams of a preferred embodiment of a metal detector incorporating the invention.

FIG. 11 is a timing diagram illustrating the waveforms at different points in the embodiment of FIGS. 10A–10F.

FIG. 12 is a waveform diagram illustrating the cancellation of ferrite response in the embodiment of FIGS. 10A–10F.

As illustrated in FIG. 1, the metal detector includes a transmitter 21 which is connected to a transmitting coil 22 for transmitting a relatively high frequency signal (e.g. 3.5 KHz) into the area in which a target 23 is located. Signals returned by the target are picked up by a receiving coil 24 and processed by a receiver 26 which includes a demodulator 27. The signals from the demodulator are compared to identify the target.

In FIG. 2, waveform PΘ represents the excitation current in the transmitting coil and waveform G(Θ) represents the output of the detector in response to a target moving past the receiving coil at a rate much lower than the excitation frequency. For ease of illustration, only the first half of the excitation cycle is shown. The second half is similar to the first. Waveform G(Θ) is sampled during the phase intervals α to β and γ to Δ to provide output signals $g_{(\alpha,\beta)}$ and $g_{(\gamma,\Delta)}$. The sampling is done in accordance with control signals $S_{(\alpha,\beta)}$ and $S_{(\gamma,\Delta)}$ which are high during the sampling windows. For the phase intervals α to β and γ to Δ, the output signals $g_{(\alpha,\beta)}$ and $g_{(\gamma,\Delta)}$ are given by the following relationships:

$$g_{(\alpha,\beta)} = \int_\alpha^\pi dG(\Theta) - \int_0^\alpha dG(\Theta) - \int_\beta^\pi dG(\Theta), \text{ and}$$

$$g_{(\gamma,\Delta)} = \int_\alpha^\pi dG(\Theta) - \int_0^\gamma dG(\Theta) - \int_\Delta^\pi dG(\Theta).$$

FIG. 3 illustrates a simple circuit for producing a waveform $g_{(x,y)}$. This circuit consists of an input switch 29, an integrator 31 and an output switch 32, with switches 29, 32 being controlled by the sampling signal $S_{(x,y)}$. Waveform G(Θ) is applied to one terminal of input switch 29, and waveform $g_{(x,y)}$ appears at the output terminal of switch 32. The integrator consists of a capacitor 33 which is connected to the output terminal of switch 29 by a resistor 34, with the lower side of the capacitor being connected to ground. The input terminals of switch 32 are connected to the top side of the capacitor and to ground.

During the phase interval x to y, when sampling signal $S_{(x,y)}$ is high, waveform G(Θ) is applied to the integrating capacitor, and the output $g_{(x,y)}$ is the integral of the waveform G(Θ). At other times, the sampling signal $S_{(x,y)}$ is low, waveform G(Θ) is disconnected from the integrator, and the output terminal of switch 32 is connected to ground, thereby resetting waveform $g_{(x,y)}$.

The response of the metal detector to any given target can thus be broken up into any desired number of independent phase intervals, with higher numbers of intervals providing more refined identifications. The control signal $S_{(x,y)}$ can provide a sampling window of any desired width and can be swept from 0 to π at any desired rate to map the transfer function of the detector's response to any desired targets as a function of phase angle. The implementation can be either analog or digital.

FIGS. 4 and 5 illustrate how a control voltage $TH_n$ can shift an excitation voltage timing waveform A anywhere from 0° to 180° to produce a sampling signal S for any desired sampling windows. In these figures, waveform P is a voltage corresponding to the excitation current in the transmitting coil, which varies about zero between a minimum value $P_{MIN}$ and a maximum value $P_{MAX}$. Waveform A represents the polarity of voltage P in that it indicates it is positive-going or negative-going. Waveforms x and y are control signals for the phase intervals in which waveform P is between $TH_X$ and $TL_X$ and between $TH_Y$ and $TL_Y$, where $TL_X=-TH_X$ and $TL_Y=-TH_Y$. Control signal S is the exclusive-OR (XOR) function of waveforms x and y.

In the circuit of FIG. 4, the value $TL_n$ is derived from control voltage $TH_n$ by applying the control voltage to the negative input of a differential amplifier 36 through a resistor 37, with a feedback resistor 38 connected between the output and the negative input of the differential amplifier. A voltage midway between $P_{MAX}$ and $P_{MIN}$ is applied to the positive input of the differential amplifier by a voltage divider consisting of resistors 39, 41. Resistors 37–41 are all of equal value, and the output of differential amplifier is $TL_n$ which, as noted above, is equal to $-TH_n$.

The circuit of FIG. 4 also includes a comparator 42 and a switch 43 controlled by waveform A for applying either $TH_n$ or $TL_n$ to the negative input of the comparator. The excitation waveform P is applied to the positive input of the comparator, and the output of the comparator is a waveform n which can, for example, be either the waveform x or the waveform y in the example of FIG. 4.

When the waveform A is positive, control voltage $TH_n$ is applied to the input of the comparator. When excitation waveform P rises above control voltage $TH_n$, the waveform n at the output of the comparator gate goes high. When excitation waveform P falls below control voltage $TH_n$, the waveform n at the output of the comparator goes low.

When the waveform A is negative, the value $TL_n$ is applied to the input of the comparator. When excitation waveform P falls below $TL_n$, the waveform n at the output of the comparator goes low. When excitation waveform P rises above $TL_n$, the waveform n at the output of the comparator goes high.

The outputs of two or more such circuits can be combined in an XOR function to generate a combined control signal such as the waveform S shown in FIG. 5 which can represent the time interval between any two points within the entire cycle of the excitation waveform. This technique is applicable with any symmetrical periodic waveform, e.g. square, sinusoidal, triangular, trapezoidal, etc., as long as the excitation voltage source does not go into current limitation.

FIG. 6 illustrates another embodiment of a circuit for sampling the detector output signal $G(\Theta)$ during a phase interval determined by a control signal $S_{(x)}$ to provide an output signal $g_{(x)}$. This circuit is similar to the circuit of FIG. 3 except that the integrator is not reset when the sampling signal is zero. In this embodiment, there is a single switch 46 which is controlled by signal $S_{(x)}$ with the detector signal $G(\Theta)$ being applied to the integrating capacitor 47 and to the output terminal 48 through resistor 49 when the switch is in its closed position.

FIG. 7 illustrates a circuit for combining the signals $g_1$ and $g_2$ from two phase intervals to provide an output signal $\rho_1$ which has no ferrite response. The signals $g_1$ and $g_2$ are chosen to have opposite polarities in their responses to ferrite. The signal $g_1$ is applied to an output amplifier 51 through a first amplifier 52, a second amplifier 53 and a resistor 54, and signal $g_2$ is applied to amplifier 51 through an amplifier 56 and a resistor 57. Amplifiers 51, 52 and 56 are unity gain amplifiers, amplifier 53 has a gain of $k_1$, and resistors 54 and 57 are equal in value.

$$\rho_1 = (k_1 g_1 + g_2)/2, \text{ and}$$

$k_1$ is selected so that $\rho_1$ has no response to ferrite.

In the circuit of FIG. 8, the signals $g_1$, $g_2$ and $g_3$ from three time intervals are combined to provide an output signal $\rho_z$ which has no ferrite response. Signals $\rho_1$ and $g_2$ are applied to the positive input of a differential amplifier 59 through resistors 61, 62 of equal value, and $k_1 g_1$ is applied to the negative input of the amplifier through a resistor 63. A feedback resistor 64 is connected between the output terminal and the negative input terminal of the amplifier. The output of the amplifier is equal to $1.5g_2 + k_1 g_1$.

The output of amplifier 59 is connected to the negative input of a second differential amplifier 66 by a resistor 67, and signal $g_3$ is to that input through a resistor 68. Output signal $\rho_2$ appears at the output of amplifier 66, and a feedback resistor 69 is connected between the output and negative input terminals of that amplifier. Resistors 67 and 68 are selected so that output signal $\rho_2$ has no ferrite response.

Output signals $\rho_1$ and $\rho_2$ are then compared to identify the target. However, since those signals have no ferrite response, ferrous mineralization in the soil surrounding the target has no effect on target identification.

FIG. 9 illustrates another embodiment in which the average values of a plurality of detector responses $g_n$ from different time intervals across the excitation waveform are combined to provide composite period averages which are compared with each other to provide target identifications that are free from both iron and soil mineralization responses. In this embodiment, $g_n$ is a signal which is the average of the detector output $G(\Theta)$ over an interval n, with all of the intervals occurring within a single cycle of the excitation waveform, and each of the composite period averages is independently free of response to soil mineralization and iron.

In this embodiment, signal $g_4$ is applied to an amplifier 71, the output of which is applied to a summing node 72 through a resistor 73. Signal $g_3$ is applied to node 72 through resistor 74, and the gain $k_4$ of amplifier 71 is adjusted to provide a signal at the node which is has no iron response. The $g_3$ signal and the signal at the output of amplifier 71 are applied to the inputs of a differential amplifier 76 to provide a signal having a large iron response.

The signal at the output of differential amplifier 76 is applied to a summing node 77 through a resistor 78, and signal $g_2$ is applied to node 77 through an amplifier 79 and a resistor 81. The gain $k_2$ of amplifier 79 is adjusted so that the signal at node 77 has no iron response.

The output signal from differential amplifier 76 is also applied to a summing node 82 through a resistor 83, and the signal $g_1$ is applied to this node through an amplifier 84 and a resistor 86. The gain $k_1$ of amplifier 84 is adjusted so that the signal at node 82 has no response to iron.

The signal at node 77 is applied to a summing node 87 through a resistor 88, and the signal at node 82 is applied to node 87 through an amplifier 89 and a resistor 91. The gain $k_5$ of amplifier 89 is adjusted so that the signal at node 87 has no iron response and no ferrite response. That signal is one of the two composite period average signals that are compared in a target identifier 92.

The signals from node 77 and amplifier 89 are also applied to a differential amplifier 93 to provide a signal which has a large ferrite response. That signal is applied to a summing node 94 by a resistor 96, and the signal with no iron response from node 72 is also applied to node 94 through an amplifier 97 and a resistor 98. The gain $k_6$ of that amplifier is adjusted so that the signal at node 94 has no iron response and no ferrite response. That signal is compared with the signal from node 87 in target identifier 92. Those signals are both composite period average signals that are free from both iron and ferrite response.

One presently preferred embodiment of a metal detector incorporating the invention is illustrated in FIGS. 10A–10F. As illustrated in FIG. 10A, this embodiment includes a battery powered power supply 101 in which a 9 volt battery 102 is connected to a voltage regulator 103 which provides an output voltage of 5 volts. A pair of relatively large (e.g. 1000 μfd) capacitors 104 are connected in series across the output of the regulator, and the junction of the capacitors is connected to ground. Thus, the supply delivers regulated output voltages of +2.5 volts and −2.5 volts relative to ground.

This embodiment also includes a oscillator 106 which comprises a 3.58 MHz ceramic resonator or crystal 107 connected to the input of a dividing counter 108. In the embodiment illustrated, the counter is a 74HC4060 binary counter, with the $Q_{10}$ output being utilized as the transmitter excitation signal. That signal has a frequency of 3.58 MHz divided by $2^{10}$, or 3.496 KHz.

The $Q_6 - Q_9$ outputs of the counter are connected to the inputs of an XOR gate 109 to provide a signal CG' which is low just before and just after $Q_{10}$ rises and falls. This waveform is illustrated in FIG. 11, and it provides a window for sampling around the transitions in $Q_{10}$.

As illustrated in FIG. 10B, the $Q_9$ and $Q_{10}$ signals are combined in a logic circuit consisting of XOR gates 111, 112 to provide a waveform B'. In this circuit, the $Q_9$ and $Q_{10}$ signals are applied to the inputs of XOR gate 111, and the output of that gate is connected to one input of XOR gate 112. The positive supply voltage is applied to the other input of gate 112, and the signal B' appears at the output of gate 112. As illustrated in FIG. 11, B' goes high in the middle of $Q_{10}$'s high period and low in the middle of $Q_{10}$'s low period.

The transmitter section of the metal detector is illustrated in FIG. 10C. In that section, excitation signal $Q_{10}$ is applied to a summing junction 113 at the negative input of an amplifier 114 through a resistor 116. The output of that amplifier is applied via a resistor 117 to another summing junction 118 at the bases of a pair of transistors 119,121 which are connected together in push-pull fashion in an output stage 122. The $Q_{10}$ and B' signals are also applied to this junction through resistors 123 and 124, respectively. A transmitting coil 126 is connected between the emitters of the output transistors and ground, and a signal corresponding to the current in the coil is fed back to summing junction 113 through an amplifier 127 and a capacitor 128. The excitation current thus applied to the transmitting coil is in the form of a linear triangular waveform.

In the receiver section, which is illustrated in FIG. 10D, signals from a receiving coil 131 are amplified in an input stage 132 to provide an analog waveform which is proportional to the current in the receiving coil. That waveform is amplified further in stages 133,134 and 136, with amplifiers 134 and 136 providing output signals POS AMP and NEG AMP of similar waveform but opposite polarity.

As illustrated in FIG. 10E, the signals POS AMP and NEG AMP are applied to the inputs of a polarity selector switch 138. This switch is controlled by a signal $Q_B$ which is derived from the CG' and B' signals. The CG' and B' signals are applied to the inputs of an XOR gate 139, and the output of that gate is connected to the $D_B$ input of a register 141. The register is clocked by the $Q_4$ signal from divider 108, and the signal at the $D_B$ input is clocked through to the $Q_B$ output. The CG' and $Q_9$ signals are applied to the $D_A$ and $D_C$ inputs, and clocked through to the $Q_A$ and $Q_C$ outputs. The $Q_B$ signal thus corresponds to the XOR function of the CG' and B' signals, and the $Q_A$ and $Q_C$ signals are clocked versions of the CG' and $Q_9$ signals. The $Q_A$, $Q_B$ and $Q_C$ signals are illustrated in FIG. 12, together with the demodulated signal 142 at the output of switch 138.

The signals from polarity selector switch 138 are passed through a scaling network 143 where they are adjusted to eliminate response to ferrite materials. The scaling network includes an input switch 144 which switches the signals between an upper branch 146 and a lower branch 147. Each of those branches includes a fixed resistor 148 and an adjustable resistor 149. The signals from the two branches are applied to the input of an UP/DOWN selector switch 151. Switches 144 and 151 are controlled by the $Q_C$ signal from register 141 and thus are in each of their positions twice during each cycle of the excitation waveform $Q_{10}$.

A bypass switch 152 is connected between the input of switch 144 and the output of the scaling network. This switch is controlled by the $\overline{Q_A}$ signal from register 141 and is closed when CG' is high and $\overline{Q_A}$ is low. When switch 152 is open, the response signal POS AMP or NEG AMP is scaled down or attenuated in accordance with the settings of resistors 148, 149, and when switch 152 is closed, the response signal passes straight through to the output channels. Compensation occurs while switch 152 is closed during relatively short intervals which are centered about the peaks of the excitation waveform. During those intervals, resistors 148, 149 are shorted out or bypassed, and the gain of the signal is increased relative to what it is when the resistors are in the circuit.

The waveforms shown in FIG. 12 for signals POS AMP, NEG AMP, and 142 represent responses to a ferrite material. The area beneath the waveform 142 between points a and c represents the average voltage of the rectified received signal during the first half of each phase of the excitation waveform. The first part of the signal (the part between points a and b) is inverted and scaled relative to the second part (the part between points b and c) to make the overall response to ferrite or magnetic soils during the first half of the phase equal to zero. That is done by making the area under the waveform between points a and b equal to the area between points b and c, i.e. by adjusting one of the resistors 149 to make the integral of the demodulated waveform during the first half of the phase equal to zero.

Similarly, the area beneath waveform 142 between points c and a represents the average voltage of the rectified received signal during the second half of each phase of the excitation waveform. The last part of this signal (the part between points d and a) is inverted and scaled relative to the first part (the part between points c and d) to make the overall response to ferrite or magnetic soils during the second half of the phase equal to zero. That is done by making the area under the waveform between points d and a equal to the area between points c and d, i.e. by adjusting one of the resistors 149 to make the integral of the demodulated waveform during the second half of the phase equal to zero.

With the responses to ferrite materials thus eliminated, the responses of the detector to targets other than ferrite are independent of the presence or absence of ferrite. Although the compensation intervals are placed at the endpoints of the excitation waveform in this particular example, they can be placed anywhere in the waveform, if desired. The effects of any number of different materials can be cancelled simultaneously by providing a different pair of compensation intervals for each of the materials.

Referring again to FIG. 10E, the output signals from switch 151 are passed through bandpass filters 156, 157 with AC gain so that a quick change produces a large output. From those filters, the signals pass through broadband filters 158, 159 with diode feedback to prevent long transient recovery periods and attenuate undesirable second derivative responses. The signals are then applied to amplifiers 162, 163, and the outputs of these amplifiers are connected to the inputs of a threshold amplifier 164. The output of the threshold amplifier is connected to the input of a comparator 165 which delivers a reset signal RST.

The outputs of integrators 162, 163 are also connected to the inputs of a DOWN integrator 166 and an UP integrator 167 which deliver DN and UP output signals. Reset switches 168, 169 are connected across the integrating capacitors and controlled by the reset signal RST. When the reset signal is low, the switches are open, and the UP and DN signals build up. When the reset signal is high, the switches are closed, and the integrators are reset.

As illustrated in FIG. 10F, the UP and DN signals are applied to the inputs of a comparator 171, the output of which is connected to the clock input of a flip-flop 172. Comparator 171 and flip-flop 172 serve as a DN/UP duty cycle modulator, with the flip-flop changing state each time the magnitudes of the DN and UP signals are large enough to be a good signal.

The UP and DN signals are also applied to the input of a second comparator 173, the output of which is a duty cycle signal D. The UP signal is connected directly to the comparator input, and the DN signal is connected via a switch 174 which is controlled by the duty cycle signal D. Operation of that switch is thus proportional to the magnitudes of the UP and DN signals.

The duty cycle signal D is also applied to a pair of sample and hold capacitors 176, 177 via a switch 178 which is controlled by the $\overline{Q}$ output of flip-flop 172. The sample and hold capacitors integrate the duty cycle signal to get a DC value. The capacitors are switched only on good values of DN and UP, i.e. when their magnitudes are sufficiently large.

The signals stored on the sample and hold capacitors are applied to the input of an amplifier 179 via a switch 181 which is also controlled by the $\overline{Q}$ output of flip-flop 172. The output of the amplifier is a target identification signal ID which is displayed on a meter 182 to indicate the identification of the target.

Means is also included for providing an audible indication that a good target signal has been found. This means includes an oscillator 184, the frequency of which is modulated in accordance with the magnitude of the UP signal. This oscillator includes a comparator 186, with the UP signal being applied to the positive input of the comparator via a light emitting diode 187. That input can also be connected to ground by a switch 188 which is controlled by the signal from comparator 171. When that signal is large enough for target identification, switch 188 closes, and the frequency of the oscillator varies with the magnitude of the UP signal. The reset signal RST is applied to the negative input of comparator 184 and disables the oscillator when it is high.

The output signal from oscillator 184 is amplified by an amplifier 189 and applied to a speaker 191.

The invention has a number of important features and advantages. Two or more different signals containing different target information, which are independent of ferrous substances, can be extracted from the response to any excitation waveform and utilized to identify non-ferrous targets by the differences in their responses.

It is apparent from the foregoing that a new and improved metal detector and method have been provided. While only certain presently preferred embodiments have been described in detail, as will be apparent to those familiar with the art, certain changes and modifications can be made without departing from the scope of the invention as defined by the following claims.

What is claimed is:

1. In a metal detector: a transmitter for producing a magnetic field having a fixed phase relationship to a periodic excitation signal in an area where a target is to be detected so that the target returns a signal having a phase that is fixed relative to the excitation signal and does not vary with the target, means responsive to the signal returned by the target for providing a waveform having a shape specific to the target and a phase which is fixed relative to the excitation signal and does not vary with the target, means for extracting samples from the waveform during different intervals in the period of the excitation signal, means for processing the samples to eliminate response to undesired material, and means for identifying the target from the samples.

2. The metal detector of claim 1 wherein the means for processing the samples to eliminate response to undesired material includes means for eliminating ferrite response.

3. The metal detector of claim 1 wherein the means for processing the samples to eliminate response to undesired material includes means for eliminating ferrite response and response to other undesired materials.

4. The metal detector of claim 1 wherein the means for extracting the samples includes means for sampling the waveform during the different intervals.

5. The metal detector of claim 1 wherein the means for processing the samples to eliminate response to undesired material includes means for making the average values of the samples equal to zero for the undesired material.

6. The metal detector of claim 1 wherein the means for processing the samples to eliminate response to undesired material includes means for integrating the samples over the sampling intervals, and means for adjusting the samples to make the integrals equal to zero for the undesired material.

7. In a method of detecting a metal object, the steps of: producing a magnetic field having a fixed phase relationship to a periodic excitation signal in an area where a target is to be detected so that the target, returns a signal having a phase that is fixed relative to the excitation signal and does not vary with the target, receiving signals returned by the target and providing a waveform having a shape specific to the target and a phase which is fixed relative to the excitation signal and does not vary with the target, extracting samples from the waveform during different intervals in the period of the excitation signal, processing the samples to eliminate response to undesired material, and identifying the target from the samples.

8. The method of claim 7 wherein the samples are processed to eliminate ferrite response.

9. The method of claim 7 wherein the samples are processed to eliminate ferrite response and response to other undesired materials.

10. The method of claim 7 wherein the samples are extracted by sampling the output signal during the different intervals.

11. The method of claim 7 wherein the samples are processed to eliminate response to undesired material by making the average values of the samples equal to zero for the undesired material.

12. The method of claim 7 wherein the samples are processed to eliminate response to undesired material by integrating the samples over the sampling intervals, and adjusting the samples to make the integrals equal to zero for the undesired material.

13. In a metal detector: a transmitting coil, means for applying a time varying excitation current to the transmitting coil to produce a magnetic field which has a fixed phase relationship to the excitation current where a target is to be detected, a receiving coil in which a current is induced by a magnetic field from the target, the current in the receiving coil having a phase which is fixed relative to the excitation current and is not affected by the target, means responsive to the current in the receiving coil for providing a waveform having a shape specific to the target, means for extracting samples of the waveform during different intervals of the excitation current, means for eliminating response to undesired material from the samples, and means for identifying the target from the samples from which response to undesired material has been eliminated.

14. The metal detector of claim 13 wherein the means for eliminating response to undesired material includes means for eliminating ferrite response.

15. The metal detector of claim 13 wherein the means for eliminating response to undesired material includes means for eliminating ferrite response and response to other undesired materials.

16. The metal detector of claim 13 wherein the means for extracting the samples includes means for sampling the waveform during the different intervals.

17. The metal detector of claim 13 wherein the means for eliminating response to undesired material includes means for making the average values of the samples equal to zero for the undesired material.

18. The metal detector of claim 13 wherein the means for eliminating response to undesired material includes means for integrating the samples over the sampling intervals, and means for adjusting the samples to make the integrals equal to zero for the undesired material.

19. In a method of detecting a metal object, the steps of: applying a time varying excitation current to a transmitting coil to produce a magnetic field which has a fixed phase relationship to the excitation current where a target is to be detected, positioning a receiving coil so that a current is induced in the receiving coil by a magnetic field from the target, the current in the receiving coil having a phase which is fixed relative to the excitation current and is not affected by the target, processing the current in the receiving coil to provide a waveform having a shape specific to the target, extracting samples of the waveform during different intervals of the excitation current, eliminating response to undesired material from the samples, and identifying the target from the samples from which the response to undesired material has been eliminated.

20. The method of claim 19 wherein ferrite response is eliminated from the samples.

21. The method of claim 19 wherein ferrite response and response to other undesired materials are eliminated from the samples.

22. The method of claim 19 wherein the samples are extracted by sampling the output signal during the different intervals.

23. The method of claim 19 wherein response to undesired material is eliminated by making the average values of the samples equal to zero for the undesired material.

24. The method of claim 19 wherein response to undesired material is eliminated by integrating the samples over the sampling intervals, and adjusting the samples to make the integrals equal to zero for the undesired material.

* * * * *